United States Patent [19]

Strazis

[11] Patent Number: 4,682,821
[45] Date of Patent: Jul. 28, 1987

[54] BICYCLE WHEEL COVER ASSEMBLY

[75] Inventor: Steven L. Strazis, Apex, N.C.

[73] Assignee: Chris Arendt, Raleigh, N.C. ; a part interest

[21] Appl. No.: 913,497

[22] Filed: Sep. 30, 1986

[51] Int. Cl.⁴ .......................... B60B 7/00; B60R 13/00
[52] U.S. Cl. .................................. 301/37 R; 301/37 P
[58] Field of Search .................. 301/37 R, 37 P, 37 S, 301/37 SA, 37 T, 37 ST, 63 PW, 64 DD; 280/156

[56] References Cited

U.S. PATENT DOCUMENTS

| | | | |
|---|---|---|---|
| 1,200,061 | 10/1916 | Wentworth | 301/37 S |
| 1,223,743 | 4/1917 | Sloper | 301/37 R |
| 1,373,889 | 4/1921 | Johnston | 301/37 SA |
| 1,403,446 | 1/1922 | Rothmann | 301/37 SA |
| 1,492,438 | 4/1924 | Druckenmueller | 301/37 R |
| 3,004,798 | 10/1961 | Tylle | 301/37 R |
| 3,141,704 | 7/1964 | Guingrich | 301/37 SA |
| 3,317,246 | 5/1967 | Wester | 301/37 R |
| 3,532,385 | 10/1970 | Foster et al. | 301/37 C |
| 3,894,777 | 7/1975 | Yamada | 301/37 SA |
| 3,924,898 | 12/1975 | Kain | 301/108 SC |
| 3,924,928 | 12/1975 | Trimble | 350/99 |
| 3,987,409 | 10/1976 | Freeman | 340/134 |
| 4,202,582 | 5/1980 | Seltman | 301/37 SA |
| 4,418,962 | 12/1983 | Schaffer | 301/37 P |
| 4,603,915 | 8/1986 | Heintz | 301/37 P |
| 4,620,749 | 11/1986 | McEachern | 301/37 SA |

Primary Examiner—Robert B. Reeves
Assistant Examiner—Russell D. Stormer
Attorney, Agent, or Firm—Richard E. Jenkins

[57] ABSTRACT

A bicycle wheel cover assembly including a pair of discs sized to cover the spokes on each side of a spoked bicycle wheel. Each disc has a center axle opening therein for the axle of the wheel to pass through and a plurality of apertures defined around the perimeter thereof. The discs are resiliently attached to a spoked wheel by providing a rubber band through each corresponding pair of apertures in the discs and then engaging opposing ends of the rubber band adjacent the outer surface of each disc with a corresponding split ring fastener. In this fashion, the rubber bands urge the split rings and discs inwardly toward one another and thereby secure the discs to each side of the bicycle wheel.

14 Claims, 5 Drawing Figures

BICYCLE WHEEL COVER ASSEMBLY

DESCRIPTION

1. Technical Field

The present invention relates to wheel covers and particularly to a bicycle wheel cover assembly which covers the spokes on a bicycle wheel in order to enhance aerodynamic efficiency and safety of bicycles.

2. Background Art

It is well known that spoked bicycle wheels, particularly wheels on racing-type bicycles commonly seen today, suffer from certain difficiencies including aerodynamic inefficiency due to the drag created by the spokes and the inherent danger of possible hand or foot contact with the spokes of the wheels. Although a number of bicycle wheel covers are presently known which attempt to address these shortcomings of spoked bicycle wheels, the wheel covers to date have all possessed a variety of shortcomings. Most notably, previous wheel covers known to applicant are fastened together utilizing assemblies which diminish the aerodynamic efficiency of the wheel covers, prevent easy access to the air valve, and interfere with decorative designs applied to the surface of the covers. The present invention overcomes the shortcomings of previous spoked bicycle wheel covers by providing a simple, lightweight wheel cover assembly having a novel fastening means which obviates the aforementioned deficiencies.

DISCLOSURE OF THE INVENTION

In accordance with the present invention, applicant provides a bicycle wheel cover assembly designed specifically to enhance the aerodynamics and improve the safety of a bicycle on which the wheel covers are installed. The wheel cover assembly comprises a pair of discs which are of a size to cover the spokes on each side of a spoked bicycle wheel. The discs are fastened together and resiliently urged into contact with the bicycle wheel by an attachment means comprising a plurality of high strength rubber bands which extend between the discs and through a plurality of apertures defined around the perimeter of each disc used to cover a bicycle wheel. The high strength rubber bands are engaged by a pair of flexible rings which are each positioned adjacent the apertures and on the outer surface of a respective one of the pair of discs. In this fashion, the flexible rings positioned on the outside perimeters of the discs urge the pair of discs inwardly toward each other and into operative engagement against the spoked bicycle wheel. The resilient attachment means used to urge the two discs against the bicycle wheel serves to provide a superior fit, an unobstructed surface for decorative design, and ease of removal for access to the valve of the tire on the wheel. Moreover, the bicycle wheel cover assembly of the invention possesses better aerodynamic efficiency than previous wheel discs since the discs do not possess the dimples or cavities necessary to accommodate bolts and the like utilized as fastening means in many previous wheel cover assemblies.

It is therefore an object of the present invention to provide an improved bicycle wheel cover assembly which eliminates the problems described above.

More specifically, it is an object of the present invention to provide a bicycle wheel cover assembly that is inexpensive and may be easily installed and removed.

Another object of the present invention is to provide an improved bicycle wheel cover assembly having superior aerodynamic efficiency.

Still another object of the present invention is to provide an improved bicycle wheel cover assembly which allows for unobstructed decoration of the surface of the disc.

Another object of the present invention is to provide a bicycle wheel cover assembly which allows for quick and easy access to the tire valve.

BRIEF DESCRIPTION OF THE DRAWINGS

Some of the objects of the invention having been stated, other objects will become evident as the description proceeds when taken in connection with the accompanying drawings, in which.

BEST MODE FOR CARRYING OUT THE INVENTION

Figure 1:
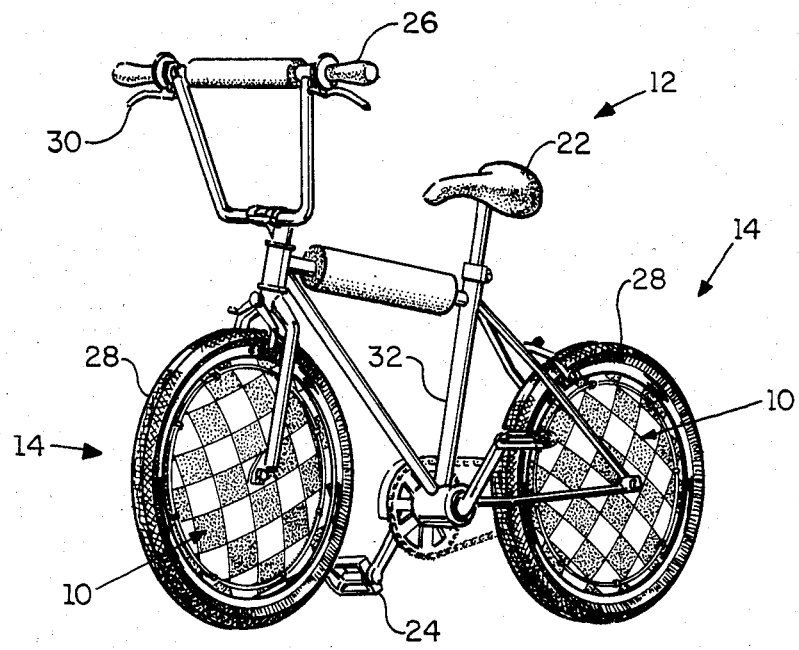
FIG. 1 is a perspective view of a bicycle having a bicycle wheel cover assembly in accordance with the present invention secured to each wheel thereof.
Figure 2:
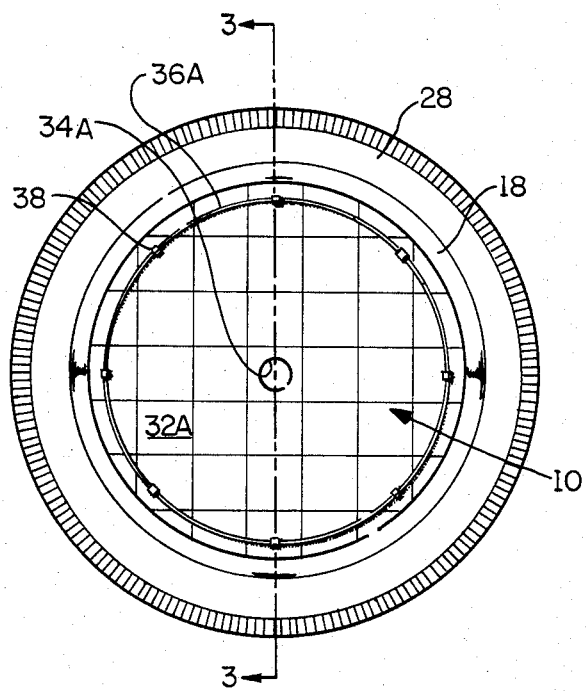
FIG. 2 is a side elevation view of a bicycle wheel having the bicycle wheel cover assembly operatively secured thereto.
Figure 3:
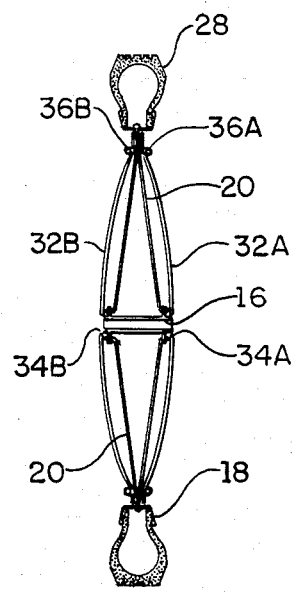
FIG. 3 is a sectional view taken on the line 3—3 of FIG. 2.
Figure 4:
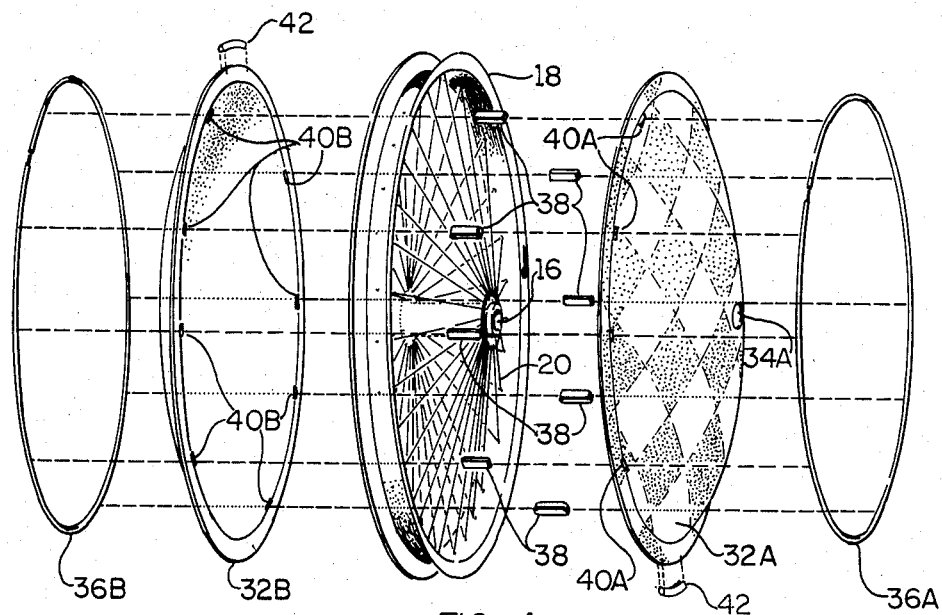
FIG. 4 is an exploded view of a bicycle wheel and the bicycle wheel cover assembly showing the elements thereof.
Figure 5:
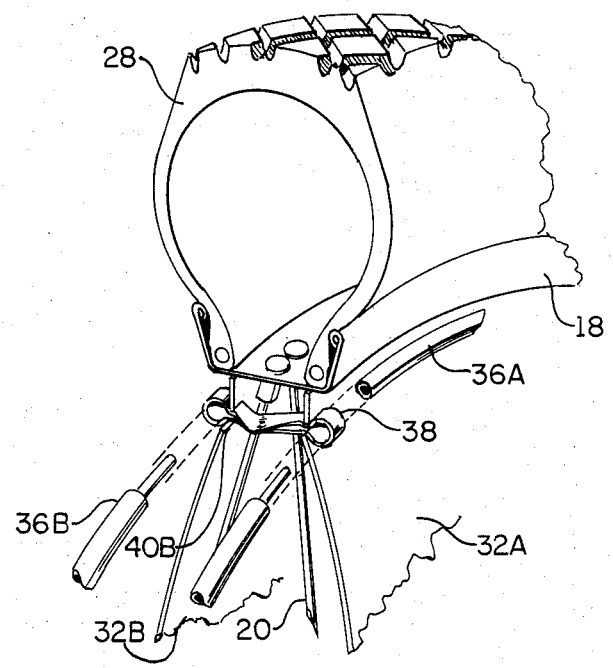
FIG. 5 is an enlarged fragmentary view of a bicycle wheel and the bicycle wheel cover assembly with parts cut away for clarity of explanation.

Referring now more specifically to the drawings, a preferred embodiment of a bicycle wheel cover assembly according to the present invention is shown in FIGS. 1-5. With specific reference now to FIG. 1, the bicycle wheel cover assembly 10 is shown attached to the front and rear wheels of a conventional racing bike for children of the type manufactured for BMX, BXC or free style riding. The bicycle 12 has a front and rear wheel 14. Wheels 14 each have an axle 16, rim 18 and radially extending spokes 20 between axle 16 and rim 18. Bicycle 12 (which is depicted as a racing type bicycle but may be of any conventional type) also includes a seat 22, pedals 24 and handle bars 26. As is known by those familiar with this particular type of children's bike, bicycle 12 is a small bicycle with knobby tires 28, hand brakes 30 and a ruggedized frame 32 which facilitate racing applications by a child operator of the bicycle.

The bicycle wheel cover assembly 10 is intended to provide a better and more aerodynamically efficient set of racing wheel covers for bicycles than has heretofore been known. The wheel cover assembly 10 is secured together with a novel fastening means which serves to enhance the aerodynamics of the wheel covers and allows the entire surfaces thereof to be utilized as desired for decorative purposes. Moreover, wheel cover assembly 10 is secured together by the novel fastening means in such a fashion that the wheel covers do not rattle and do not require an access hole for the tire air valve since the wheel covers may be easily removed and replaced on wheel 14. The fastening means of wheel cover assembly 10 also allow the wheel covers to be substantially self-adjusting and serve to prevent rattling experienced with conventional wheel covers.

Bicycle wheel cover assembly 10 secured to each wheel 14 includes a pair of discs 32a, 32b (see FIG. 4) which are adapted to fit against each side of wheel 14 in order to cover spokes 20 for improved aerodynamics and safety for the operator of bicycle 12. Discs 32a, 32b include an aperture 34a, 34b (not shown), respectively, in the center thereof in order to allow axle 16 to extend therethrough. Most suitably the discs are constructed of high impact 0.060 inch polystyrene which has been vacuum formed into a concave configuration having a depth of 1 ⅜ inches for the front discs and 1 inch for the rear discs. Center apertures 34a, 34b are 1 inch in diameter for the front discs and 1 ¾ inch in diameter for the rear discs, and the total diameter of discs 32a, 32b is 15 ⅜ inches. Decorative designs may be placed on the discs, as desired, by applying ultraviolet fade resistant polyurethane paint to the plastic sheets from which the discs are subsequently vacuum formed.

Bicycle wheel cover assembly 10 utilizes a resilient fastening means to urge discs 32a, 32b into operative engagement with wheel 14. With reference now again to FIG. 4, it should be appreciated that the fastening means includes split rings 36a, 36b which are secured against the outside perimeter of corresponding discs 32a, 32b by high strength rubber bands 38. Rubber bands 38 extend between spokes 20 of wheel 14 and through a corresponding pair of apertures 40a, 40b located adjacent the edge of discs 32a, 32b, respectively. Most suitably eight apertures 40a are located in disc 32a and eight corresponding apertures 40b are located in disc 32b to accommodate eight rubber bands 38. Rubber bands 38 are most suitably ¼ inch wide and 1 inch in diameter and are fabricated from high strength bicycle inner tube material which is more durable than conventional rubber band constructions. Rubber bands 38 serve to urge split rings 36a, 36b inwardly against the perimeter of discs 32a, 32b and to urge the discs into operative contact against the base of spokes 20 carried within wheel 14. Rubber bands 38 are particularly effective as an element of the fastening means of bicycle wheel cover assembly 10 since a relatively large number may be used and they may be threaded around any obstructing spokes 20 of wheel 14 in their pathway between discs 32a, 32b.

Split rings 36a, 36b are preferably constructed of ¼ inch diameter hollow plastic tubing having a male and female end (see FIG. 5) in order to facilitate opening and closure of the split ring. Split rings 36a, 36b are utilized to engage and retain rubber bands 38 since they are lightweight, and easy to work with. Also, split rings 36a, 36b serve to distribute the tension applied thereto by rubber bands 38 evenly around the perimeter of corresponding discs 32a, 32b and are aerodynamically efficient. As a matter of choice, shims 42 constructed of short lengths of rubber tubing having a longitudinal slit therein may be fitted on the edge of discs 32a, 32b, as needed, in order to accommodate for slight variations in the rim size of wheels to which the discs are attached. All materials described above were selected because of their essential durability, light weight, low cost and lack of tendency to rattle.

In operation, the operator of bicycle 12 would most suitably secure bicycle wheel cover assembly 10 to each wheel 14 of bicycle 12 as follows although other methods are certainly feasible. First of all, one of discs 32a, 32b (32b for the purposes of explanation) is first positioned against wheel 14. As can clearly be seen in FIGS. 3 and 5, the substantially flat flange around the perimeter of disc 32b will come into contact with the base of spokes 20 extending from axle 16 to rim 18 of wheel 14. Next, split ring 36b is opened and eight rubber bands 38 positioned thereon before it is closed and placed adjacent disc 32b. Rubber bands 38 are pulled through apertures 40b around the perimeter of disc 32b and then laterally through spokes 20 of wheel 14. The second disc 32a is fitted against the other side of wheel 14 and rubber bands 38 pulled through apertures 40a around the perimeter thereof with a hook or other suitable implement. Split ring 36a is opened and threaded through the ends of all rubber bands 38 in order to engage them on split ring 36a before it is closed and allowed to seat itself around the outside surface perimeter of disc 32a. In this fashion, split rings 36a, 36b serve to distribute the tension provided by rubber bands 38 evenly around the perimeter of discs 32a, 32b and urge them inwardly against the base of spokes 20. Although described for only one wheel, this procedure would be repeated to secure a second pair of discs to the second wheel of a bicycle.

In view of the resilient nature of rubber bands 38 holding the wheel cover assembly in place on wheel 14, wheel cover assembly 10 can accommodate minor distortions due to impact and the like to wheel 14 without requiring adjustment. Moreover, since rubber bands 38 may be threaded around obstructing spokes 20 of wheel 14, a relatively large number of rubber bands 38 may be used around the perimeter of discs 32a, 32b to secure the discs to wheel 14 without the necessity of obstructing the surface of the discs with a bolt or other known fastening means. This allows for enhanced aerodynamic performance of wheel cover assembly 10 as well as ease of attachment and removal of discs 32a, 32b when necessary to gain access to wheel 14 for purposes of inflating the tire or the like. Also, the attachment means of the present invention allows for application of a design to the entirety of the surface of discs 32a, 32b without the interference in the decorative design previously suffered due to bolts or other fastening means.

It will be understood that various details of the invention may be changed without departing from the scope of the invention. Furthermore, the foregoing description is for the purpose of illustration only, and not for the purpose of limitation—the invention being defined by the claims.

What is claimed is:

1. A wheel cover assembly for spoked wheels of the type including a center axle and an outer rim supported from said axle by means of a plurality of spokes, said assembly comprising:

a pair of discs sized to cover each side of the spokes on a spoked wheel and each having a center axle opening therein for an axle to extend through; and attachment means for attaching said pair of discs together through said spokes, said attachment means including a plurality of apertures defined in spaced-apart relationship around the perimeter of each of said pair of discs so that said discs can be positioned on a spoked wheel with the apertures in one disc in substantial paired alignment with the apertures in the other disc, a plurality of elastomeric tension elements each being adapted to be extended between said discs and through a pair of said aligned apertures, and a pair of annular retainer members each being adapted to be positioned adjacent the apertures on the outer surface of a respective one of said pair of discs and to engage and retain said elastomeric tension elements, said pair of retainer members thereby urging said corresponding pair of discs inwardly into operative engagement against said spoked wheel.

2. A wheel cover assembly according to claim 1 wherein said discs are constructed of polystyrene.

3. A wheel cover assembly according to claim 2 wherein said discs have a generally concave shape.

4. A wheel cover assembly according to claim 1 wherein said plurality of apertures comprises eight apertures equally spaced around the perimeter of each of said discs.

5. A wheel cover assembly according to claim 4 wherein said plurality of elastomeric tension elements comprises eight high strength closed loop rubber bands.

6. A wheel cover assembly according to claim 5 wherein each of said eight rubber bands is provided to extend between said discs and through a corresponding one of said eight pairs of aligned apertures in said discs.

7. A wheel cover assembly according to claim 1 wherein each of said pair of annular retainer members comprises a closed loop plastic ring.

8. A wheel cover assembly according to claim 7 wherein said plastic ring is adapted to be opened and closed as necessary in order to engage said plurality of elastomeric tension elements.

9. A wheel cover assembly for spoked wheels of the type including a center axle and an outer rim supported from said axle by means of a plurality of spokes, said assembly comprising:
- a pair of discs sized to cover each side of the spokes on a spoked wheel and each having a center axle opening therein and a plurality of apertures defined in spaced-apart relationship around the perimeter thereof, said apertures in one disc being in substantial paired alignment with the apertures in the other disc when said discs are placed into operative engagement with a spoked wheel;
- a plurality of closed loop rubber bands each being adapted to be extended between said discs and through a pair of said aligned apertures; and
- a pair of plastic rings each being adapted to be positioned adjacent the apertures on the outer surface of a respective one of said pair of discs and to engage and retain said rubber bands, said plastic rings thereby urging said corresponding pair of discs inwardly into operative engagement against said spoked wheel.

10. A wheel cover assembly according to claim 9 wherein said discs are constructed of polystyrene and each defines a generally concave shape.

11. A wheel cover assembly according to claim 9 wherein said plurality of apertures comprises eight apertures equally spaced around the perimeter of each of said discs and said plurality of rubber bands comprises eight rubber bands.

12. A wheel cover assembly according to claim 11 wherein each of said eight rubber bands is provided to extend between said discs and through a corresponding one of said eight pairs of aligned apertures in said discs.

13. A wheel cover assembly according to claim 9 wherein each of said pair of plastic rings is adapted to be opened and closed as necessary in order to engage said plurality of rubber bands.

14. A wheel cover assembly according to claim 13 wherein each of said pair of plastic rings is a split ring and includes a male and a cooperating female end to facilitate opening and closing thereof.

* * * * *